United States Patent [19]

Bonsall et al.

[11] Patent Number: 5,640,296
[45] Date of Patent: Jun. 17, 1997

[54] TOUCH SCREEN ENCLOSURE HAVING A UNIVERSAL REAR ENCLOSURE UNIT, A TOUCH SCREEN PLATE, AND FIRST AND SECOND SEALS

[75] Inventors: Glenn Douglas Bonsall; Ezra Timothy Peachey, both of Vancouver, Canada

[73] Assignee: Dynapro Systems, Inc., New Westminster, Canada

[21] Appl. No.: 534,807

[22] Filed: Sep. 27, 1995

[51] Int. Cl.$^6$ .............................. G06F 1/16; H05K 5/06; H05K 7/12
[52] U.S. Cl. ............................... 361/681; 361/724
[58] Field of Search .................... 364/708.1; 178/18; 345/173, 175, 905; 40/448, 575; 312/7.2, 223.2, 223.3; 359/83; 361/681–683, 690

[56] References Cited

U.S. PATENT DOCUMENTS

| | | |
|---|---|---|
| 4,545,023 | 10/1985 | Mizzi ............................... 345/173 X |
| 4,716,496 | 12/1987 | Fritsch . |
| 4,720,781 | 1/1988 | Crossland et al. . |
| 4,746,919 | 5/1988 | Reitmeier . |
| 4,775,765 | 10/1988 | Kimura et al. . |
| 4,786,896 | 11/1988 | Harte . |
| 4,789,858 | 12/1988 | Fergason et al. . |
| 4,814,760 | 3/1989 | Johnston et al. . |
| 4,821,029 | 4/1989 | Logan et al. . |
| 4,839,634 | 6/1989 | More et al. . |
| 4,870,458 | 9/1989 | Shibuya et al. . |
| 4,873,578 | 10/1989 | Tognoni et al. . |
| 4,911,536 | 3/1990 | Ditzik . |
| 4,931,907 | 6/1990 | Robinson et al. . |
| 5,065,278 | 11/1991 | Schultz ............................ 361/690 X |
| 5,150,231 | 9/1992 | Iwamoto et al. . |
| 5,194,852 | 3/1993 | More et al. . |
| 5,235,509 | 8/1993 | Mueller et al. . |
| 5,299,043 | 3/1994 | Taylor et al. . |
| 5,351,143 | 9/1994 | Sato et al. . |
| 5,351,176 | 9/1994 | Smith et al. ............................ 361/681 |
| 5,379,057 | 1/1995 | Clough et al. . |
| 5,390,005 | 2/1995 | Kimoto et al. . |
| 5,430,607 | 7/1995 | Smith ............................ 361/683 |

*Primary Examiner*—Michael W. Phillips
*Attorney, Agent, or Firm*—Foley & Lardner

[57] ABSTRACT

An enclosure system for an electronic device such as a capacitive touch screen system preferably includes a front cover coupled to a universal rear enclosure unit via a hinge. A pan located between the front cover and the universal rear enclosure unit is pivotably coupled to the front cover. The front cover houses a touch screen and a display between the pan and the front cover. The universal rear enclosure unit houses computer equipment and power electronics for use by the touch screen, and does not have to be individually sized based on the size of the touch screen. The enclosure system also includes a seal between the front cover and the touch screen plate and between the touch screen plate and the universal rear enclosure unit, which prevents moisture or other debris from entering the enclosure system.

20 Claims, 11 Drawing Sheets

TOUCH SCREEN ENCLOSURE HAVING A UNIVERSAL REAR ENCLOSURE UNIT, A TOUCH SCREEN PLATE, AND FIRST AND SECOND SEALS

CROSS-REFERENCE TO RELATED APPLICATIONS

The present application is related to the application entitled, "A Touch Screen Enclosure Having An Insertable Graphic Sheet, U.S. patent application Ser. No. 08/534,373" filed by Glenn D. Bonsall on an even date herewith, assigned to the assignee of the present invention. The present application is also related to the application entitled, "A Touch Screen Enclosure Optimized For Ease of Serviceability, U.S. patent application No. 08/534,374" filed by Bonsall, et al. on an even date herewith, and assigned to the assignee of the present invention.

1. Field of the Invention

The present invention generally relates to an enclosure for electronic appliances, equipment or devices. More particularly, the present invention relates to a sealed enclosure system or housing unit for a touch screen.

2. Background of the Invention

Touch screen systems such as capacitive touch screens generally include a sensor matrix or array and a control circuit. The control circuit measures capacitive loading on the array to determine the position or location of the touch on the array. The array is mounted on a translucent screen or substrate. The control circuit generally receives electrical power from power circuitry which is electrically coupled to the control circuit. The power circuitry can be comprised of a power supply and a fan.

The touch screen is typically utilized in conjunction with a liquid crystal display or other light sources. The display projects variable images upon or through the touch screen. Touch screen systems also can include various computer equipment such as a motherboard, ISA cards, hard drives, memory, floppy drives, graphic devices, or other equipment for enhancing the functions and capabilities of the touch screen system.

Prior art touch screen systems including the touch screen, display, and computer equipment are generally contained in an enclosure comprised of a front bezel or shroud and a back enclosure. The touch screen components including the control circuit, sensor array, and power circuits are located on a single chassis between the shroud and the rear enclosure. The display and computer equipment are also located between the rear enclosure and the shroud. The rear enclosure generally contains the more bulky computer equipment, electronic components and other devices.

Touch screen systems are typically sized in accordance with particular applications. For example, applications requiring large menus, displays, or selection areas typically require larger touch screens. In contrast, applications which must be portable or which require the touch screen be contained in a small area often utilize a smaller touch screen.

Despite the difference in touch screen sizes, the computer equipment, electronic components, and other devices generally require the same amount of space whether they are used with a large or small touch screen. Heretofore, the entire touch screen enclosures have had to be designed for the particular size of the touch screen. The shroud and rear enclosure are typically sized according to the individual size of the touch screen. Further, enclosures often include seals between the shroud and rear enclosure so liquids, dirt and other debris does not enter the touch screen enclosure. These seals require that the back enclosure be in close conformance with the shroud to prevent liquids or other debris from penetrating the enclosure system. Therefore, prior art configurations of enclosure systems for touch screens are particularly disadvantageous because enclosure systems must be designed for each size of the touch screen. Having individually sized touch screen enclosures increases the cost associated with the materials and the manufacture of the enclosure system.

Thus, there is a need for an enclosure system having a universal rear enclosure unit. There is also a need for a sealing system which allows a universal rear enclosure unit to be coupled to a variety of different sized bezels and yet have a NEMA rated seal.

SUMMARY OF THE INVENTION

The present invention relates to an enclosure system for a touch screen being one of a plurality of screen sizes. The enclosure system includes a front enclosure cover, a touch screen plate, a first seal, a rear enclosure, and a second seal. The front enclosure cover is one of a plurality of cover sizes associated with the one of the screen sizes and houses the touch screen. The touch screen plate is a plate size associated with the screen size. The first seal is disposed between the front enclosure cover and a first side of the touch screen plate. The rear enclosure is a single enclosure size for use with the different front cover sizes. The rear enclosure houses electronic components associated with the touch screen. The second seal is disposed between a second side of the touch screen plate and the rear enclosure.

The present invention also relates to an enclosure for a touch screen system including a touch screen and electronic circuitry. The touch screen is one of a number of different touch screen sizes. The enclosure includes a touch screen plate, a front housing section configured to cover the touch screen, a rear housing section configured to hold the electronic circuitry, and a sealing system disposed between the front housing section and the rear housing section. The front housing section is a front housing size associated with one of the touch screen sizes. The touch screen is disposed between the front housing section and the touch screen plate. The sealing system provides a seal between the front cover and the touch screen plate and between the touch screen plate and the rear housing section.

The present invention also relates to a universal rear enclosure unit for a touch screen system. The touch screen system includes a touch screen and an electronic circuit. The touch screen is contained in a front enclosure cover which is one of a plurality of different sizes. The front enclosure cover includes a touch screen plate being a plate size associated with the one of the different sizes and is sealably coupled to the rear enclosure unit. The rear housing section has an opening. The touch screen plate is sealably coupled to the rear housing section at the opening.

According to an exemplary aspect of the present invention, the universal rear enclosure unit is sealed to the touch screen plate which prevents moisture or other debris from entering between the touch screen plate and the universal rear enclosure. Another seal between the front enclosure cover and the touch screen plate prevents moisture or other debris from entering between the touch screen plate and the front enclosure cover. By using this two seal technique, the same rear enclosure can be advantageously used with different sizes of front covers and touch screens. Therefore, manufacturing and equipment costs are significantly reduced in the production of a single universal rear enclosure unit.

DETAILED DESCRIPTION OF THE PREFERRED EXEMPLARY EMBODIMENT

Figure 1:
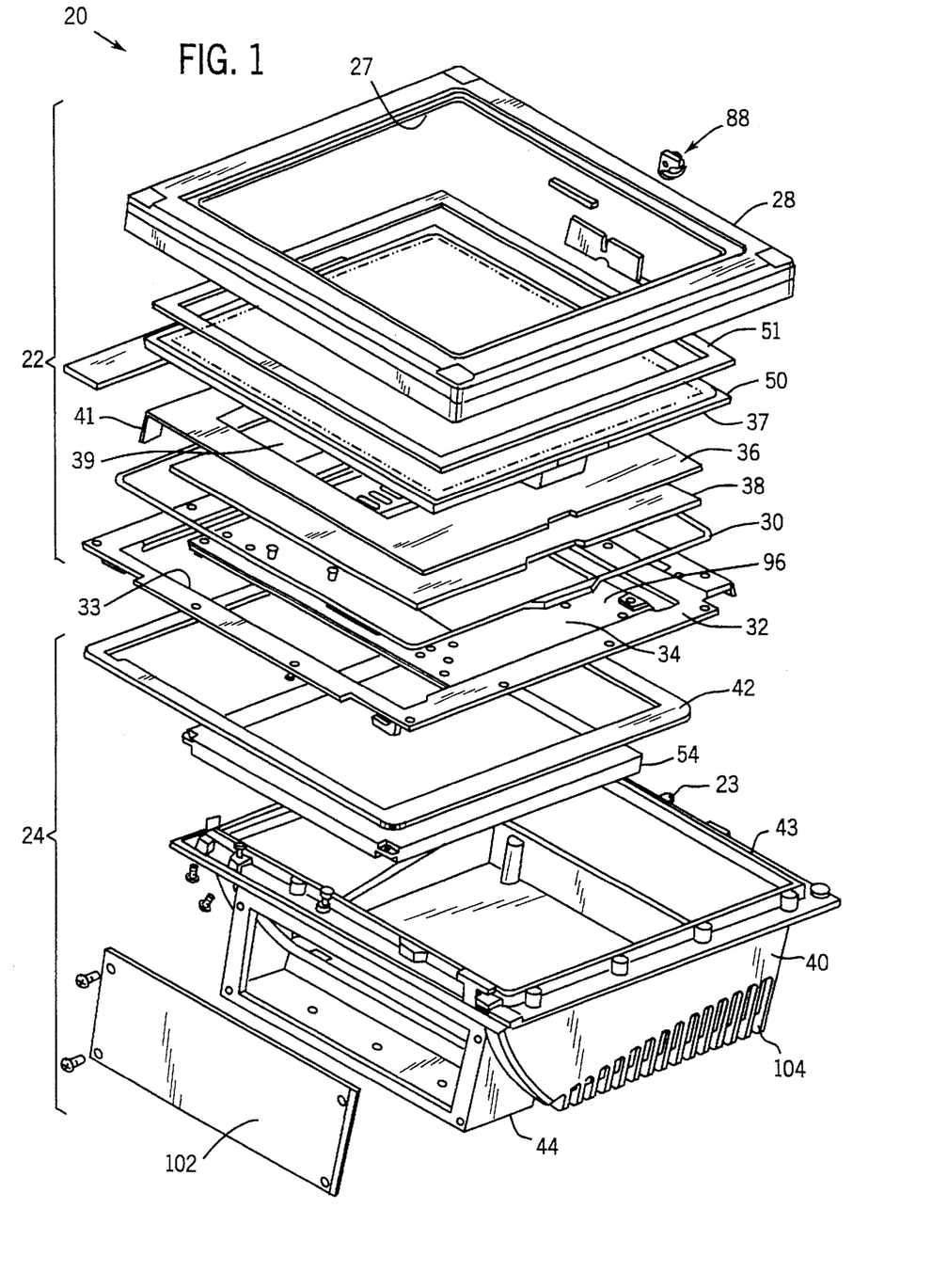
FIG. 1 is an exploded perspective view showing the front of a short bezel touch screen enclosure system in accordance with a first exemplary embodiment of the present invention.

FIG. 1 illustrates a touch screen enclosure system 20 which houses a touch screen such as capacitive touch screen 50. Enclosure system 20 includes a front enclosure section 22 and a rear enclosure section 24.

Front enclosure section 22 includes a short bezel 28, a seal 30, a touch screen plate 32, a touch screen gasket 51 and a pan 34. Plate 32 is stainless steel and has an aperture 33 which is covered by pan 34. Bezel 28 is die cast aluminum and has an aperture 27 so a user can directly touch screen 50.

A display such as an LCD flat panel display 54 and touch screen 50 are held between pan 34 and short bezel 28. Preferably, display 54 is directly attached to a front side 96 of pan 34 by screws (not shown). Screen 50 is held between short bezel 28 and display 54 and surrounded by seal 30. Seal 30 lies within bezel 28 and has a circular cross sectional area.

Front enclosure 22 also can house a graphics underlay or insertable custom graphics sheet 36 and a plastic retaining member 38. Plastic retaining member 38 presses sheet 36 against a back surface 37 of touch screen 50. Sheet 36 can include menus, instructions, customized graphics or other information. Retainer 38 includes an aperture 39 so light and images from display 54 can pass through retainer 38, sheet 36 and screen 50. Display 54 extends from pan 34 through aperture 33 to retainer 38.

Rear enclosure unit 24 includes a rear enclosure 40 and a rear enclosure seal 42. Rear enclosure 40 preferably includes a hatch 44 which is discussed in more detail with reference to FIGS. 7–9. Seal 42 sits on a ridge 43 of enclosure 40 and has a rectangular cross sectional area. Seal 42 is wider than ridge 43. Rear enclosure 40 may also include an extended hatch cap 48 (FIG. 11) attached to hatch 44 for storing bulky power connectors and power cables. Enclosure 40 is die cast aluminum and includes heat dissipation fins 104 and a latch member 23.

Figure 2:
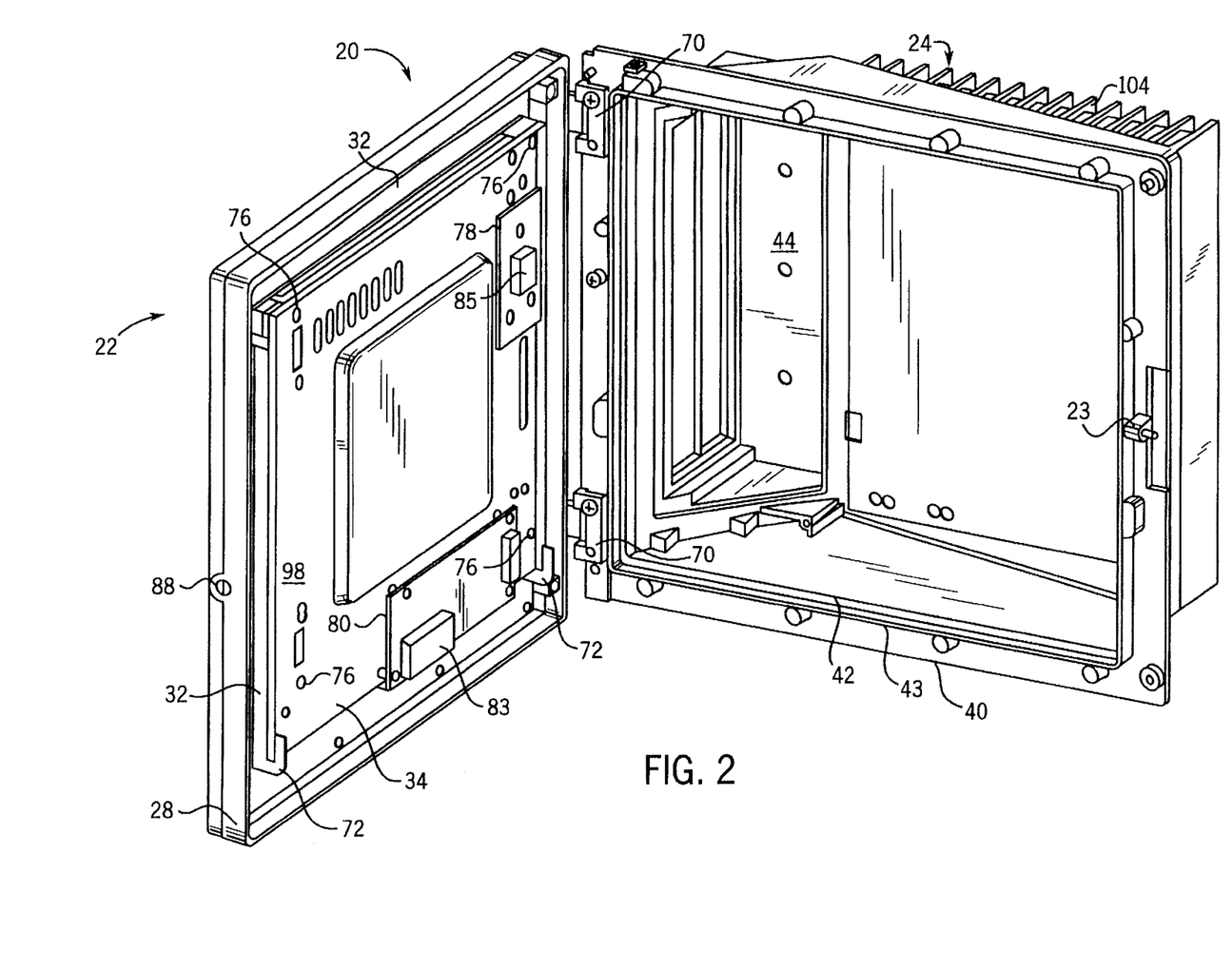
FIG. 2 is a perspective view of the short bezel touch screen enclosure system illustrated in FIG. 1 shown with a front enclosure section opened from a rear enclosure section.

With reference to FIG. 2, enclosure system 20 is shown in an open position (e.g., front enclosure 22 is open from rear enclosure 24). Front bezel 28 is pivotably coupled to rear enclosure 40 by hinges 70. Hinges 70 allow front bezel 28 to be swung away from rear enclosure 40. Pan 34 is configured so display 54 is positioned in aperture 33 (FIG. 1) of plate 32 when pan 34 is in a closed position.

Front bezel 28 includes a latch mechanism 88 which engages latch member 23 (FIG. 1) on rear enclosure 40 when enclosure system 20 is in a closed position (e.g., front bezel 28 is closed upon rear enclosure 40). Latch mechanism 88 is preferably driven by an Allen wrench or other key (not shown) and includes a grooved cam (not shown) which captures and locks latch element 23.

Pan 34 rests on hook elements 72 of touch plate 32 and is secured to plate 32 by screws 76 when pan 34 is in a closed position. Plate 32 is attached to front bezel 28 via screws or other attachment devices. Control electronics 78 for display 24 and control electronics 80 for touch screen 50 are mounted to a rear side 98 of pan 34. A connector 83 for electronics 80 and a connector 85 for electronics 78 are disposed to connect to screen 50 and display 54, respectively, via conductors which wrap around the edges of or are disposed through pan 34.

Sheet 36 includes tabs 41 which allow sheet 36 to be removed from between screen 50 and retainer 38 while pan 34 is open. Sheet 36 can also be inserted between screen 50 and retainer 38 via tabs 41.

The orientation of system 20 advantageously compartmentalizes the various components of the touch screen system. For example, computer equipment (not shown) such as a motherboard, ISA cards, disk drives, memory, and other electronic devices, is stored in rear enclosure 40, display 54 is stored on front side 96 (FIG. 1) of pan 34, and screen 50 is stored adjacent aperture 27 (FIG. 1) of bezel 28. Such a configuration allows service personnel to more easily access the various components stored in system 20. Access to connectors 83 and 85, control circuitry 80, control circuitry 78, and the computer equipment (not shown) is made simply by opening latch mechanism 88 and swinging front enclosure section 22 from rear enclosure section 24.

Figure 3:
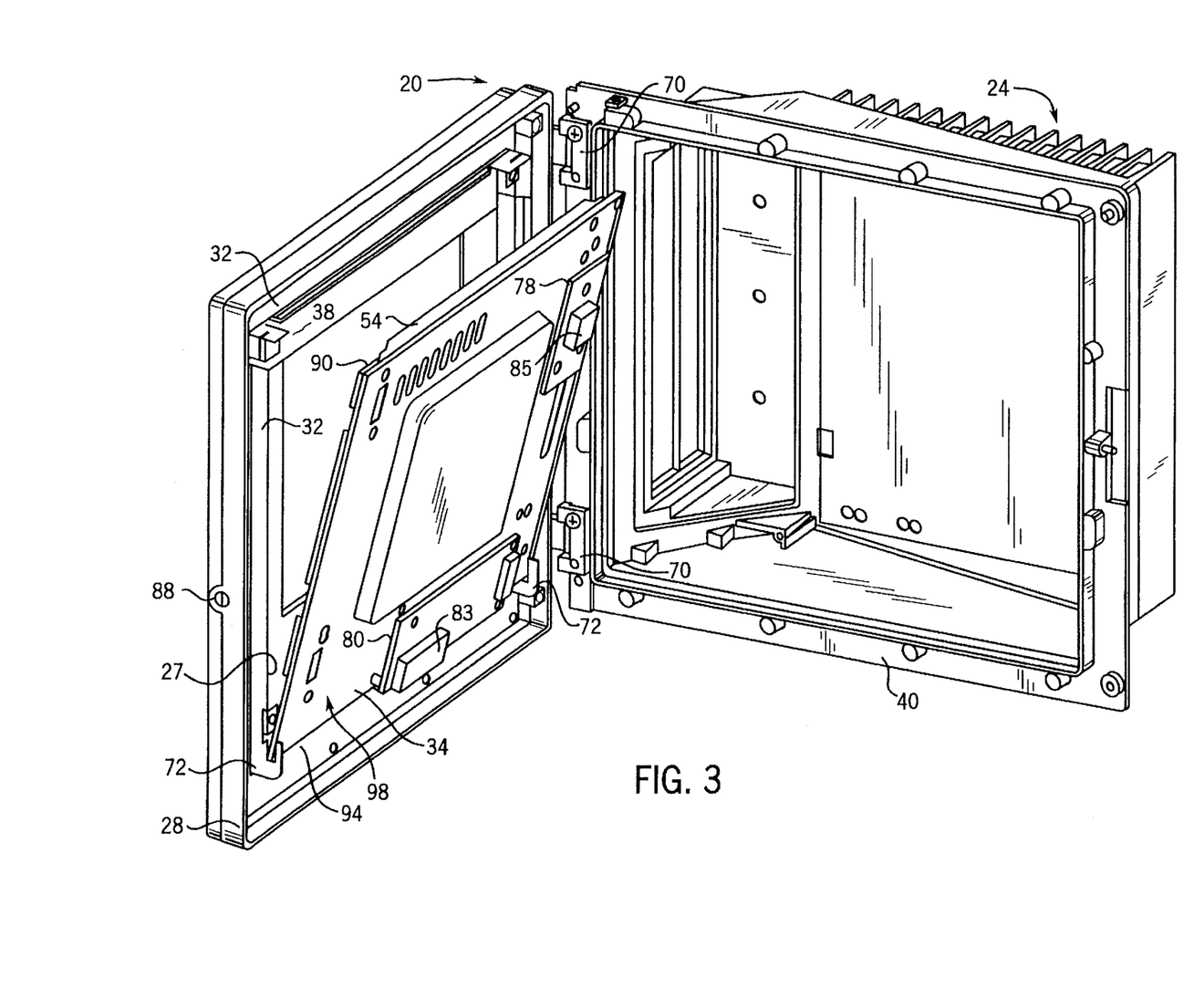
FIG. 3 is a perspective view of the short bezel touch screen illustrated in FIG. 2 shown with a pan in an open position from a bezel.

In FIG. 3, pan 34 is shown in an open position. Retainer 38 is held between plate 32 and screen 50. Sheet 36 (FIG. 1) can be pulled from between retainer 38 and screen 50 by tabs 41 for cleaning or replacement. Mounting sheet 36 behind screen 50 protects sheet 36 from wear. Thus, the configuration of pan 34 and front bezel 28 allows easy servicing of graphic sheet 36.

Pan 34 can be pivotably opened or tilted away from plate 32 by removing screws 76 and allowing pan 34 to rest on hook elements 72. Hook elements 72 receive an end 94 of pan 34. Preferably, display 54 is mounted on pan 34 and the light source (not shown) of display 54 can be slid out from a side 90 when pan 34 is pivotably open from plate 32. Such a configuration allows routine maintenance to be easily performed on display 54 without requiring disassembly of major components within touch screen enclosure system 20. For example, the light tube (not shown) associated with display 54 may be easily reached simply by pivotably opening or tilting pan 34 from front bezel 28. Additionally, such a configuration provides service personnel with limited access to screen 50 and display 54 when pan 34 is in an open position.

Figure 4:
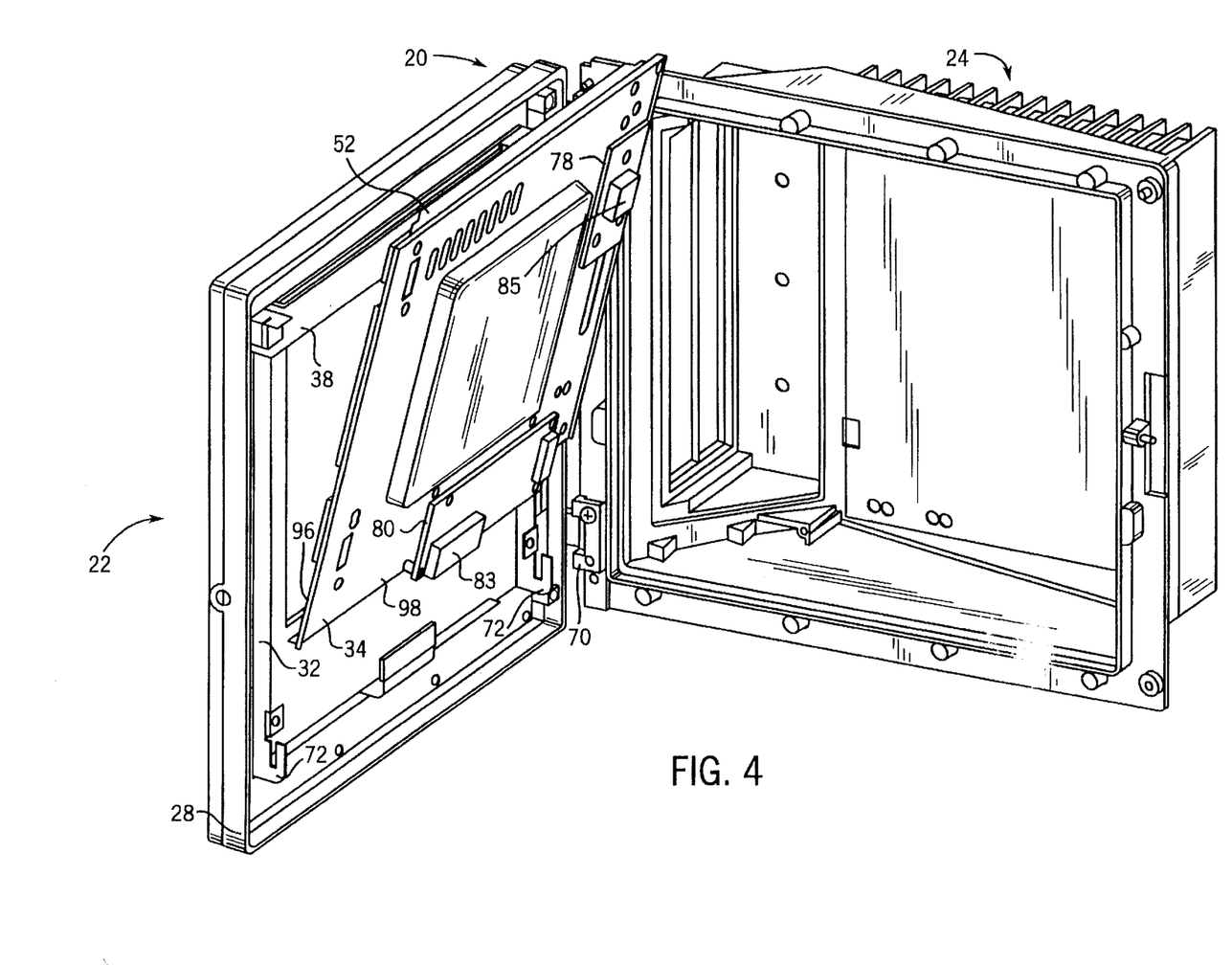
FIG. 4 is a perspective view of the short bezel touch screen illustrated in FIG. 3 shown with the pan removed from the bezel.

With reference to FIG. 4, system 20 is shown with pan 34 completely removed from bezel 28 and plate 32. Pan 34 may be removed when major servicing is needed on components such as display 54, circuit 78 or circuit 80 by removing screws 76 and lifting pan 34 from hook elements 72. Such a feature allows service personnel to completely replace all components on pan 34 merely by attaching a new pan 34 (housing the associated components) and reconnecting connectors 83 and 85. The replaced pan 34 can be sent offsite for further testing of components such as display 54, circuit 78, and circuit 80. Removing pan 34 also provides unencumbered access to other components located in front bezel 28 such as retainer 38, graphic sheet 36, seal 30, and touch screen 50.

Figure 5:
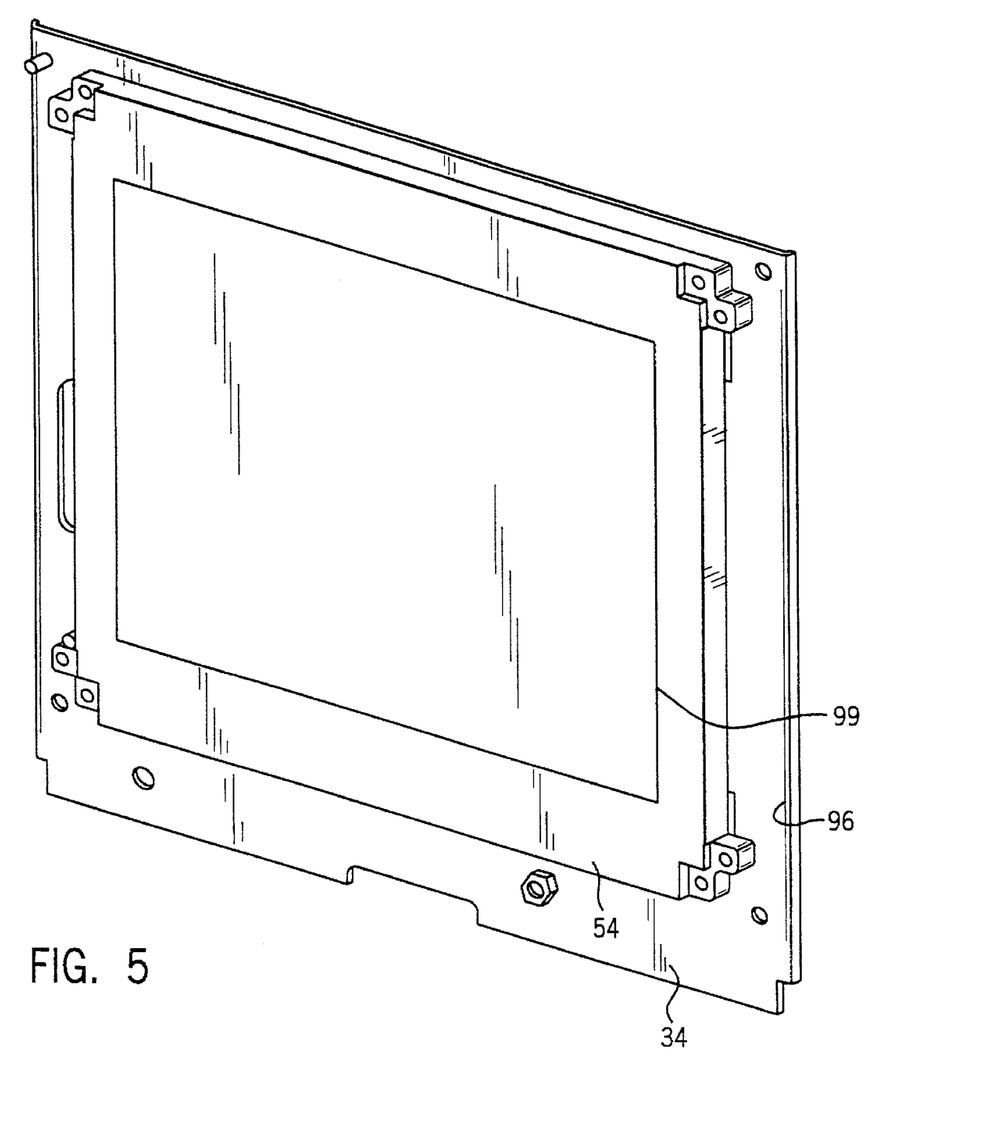
FIG. 5 is a more detailed perspective view of the pan illustrated in FIG. 4 showing a front surface of the pan.
Figure 6:
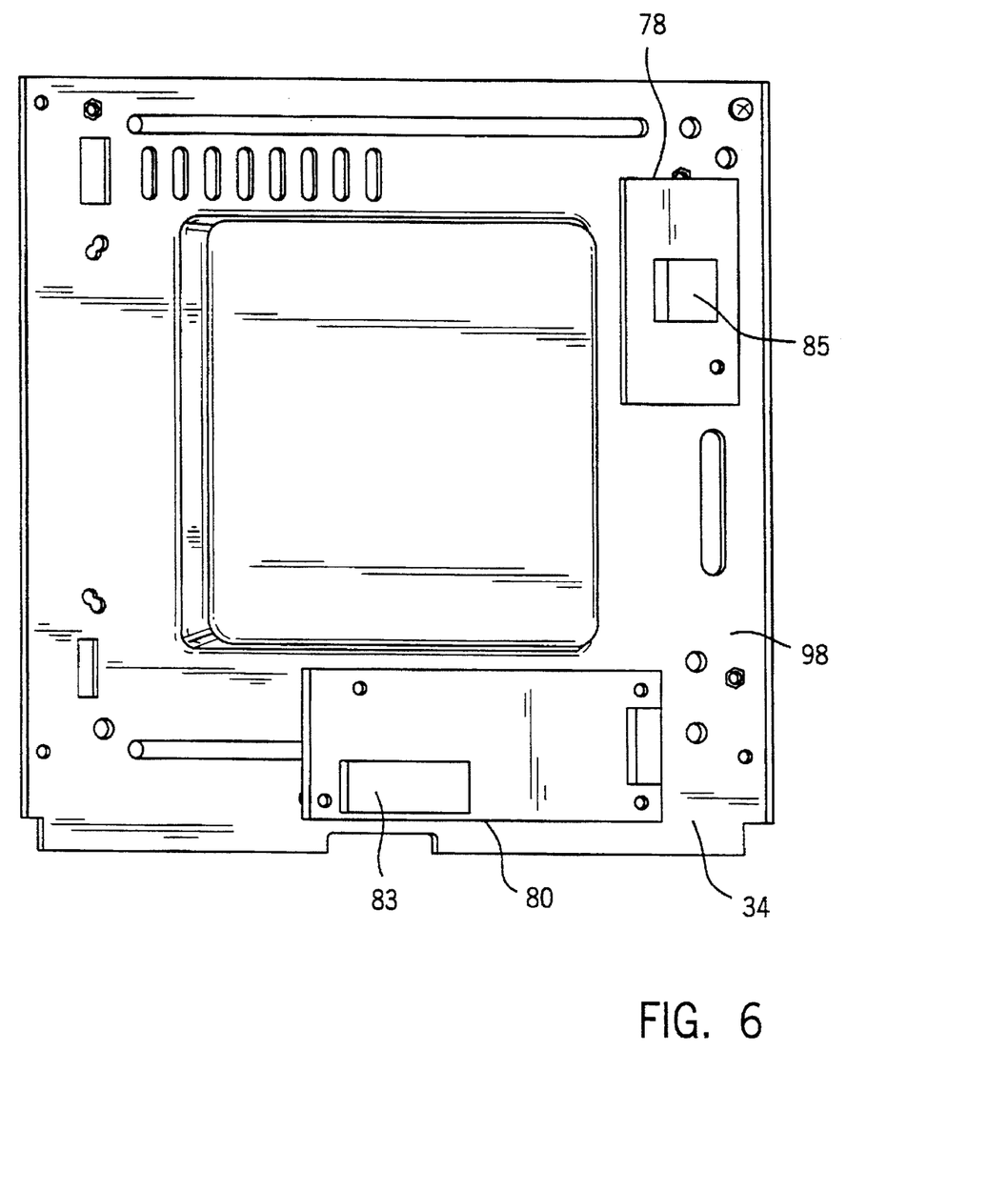
FIG. 6 is a perspective view of the pan illustrated in FIG. 4 showing a rear surface of the pan.

With reference to FIG. 5, a more detailed view of front side 96 of pan 34 is shown. Display 54 is mounted on front side 96 of pan 34. Display 54 includes a display area 99 which corresponds to aperture 39 of retainer 38. With reference to FIG. 6, rear side 98 of pan 34 is shown in more detail. Rear side 98 includes control circuits 78 and 80.

Figure 7:
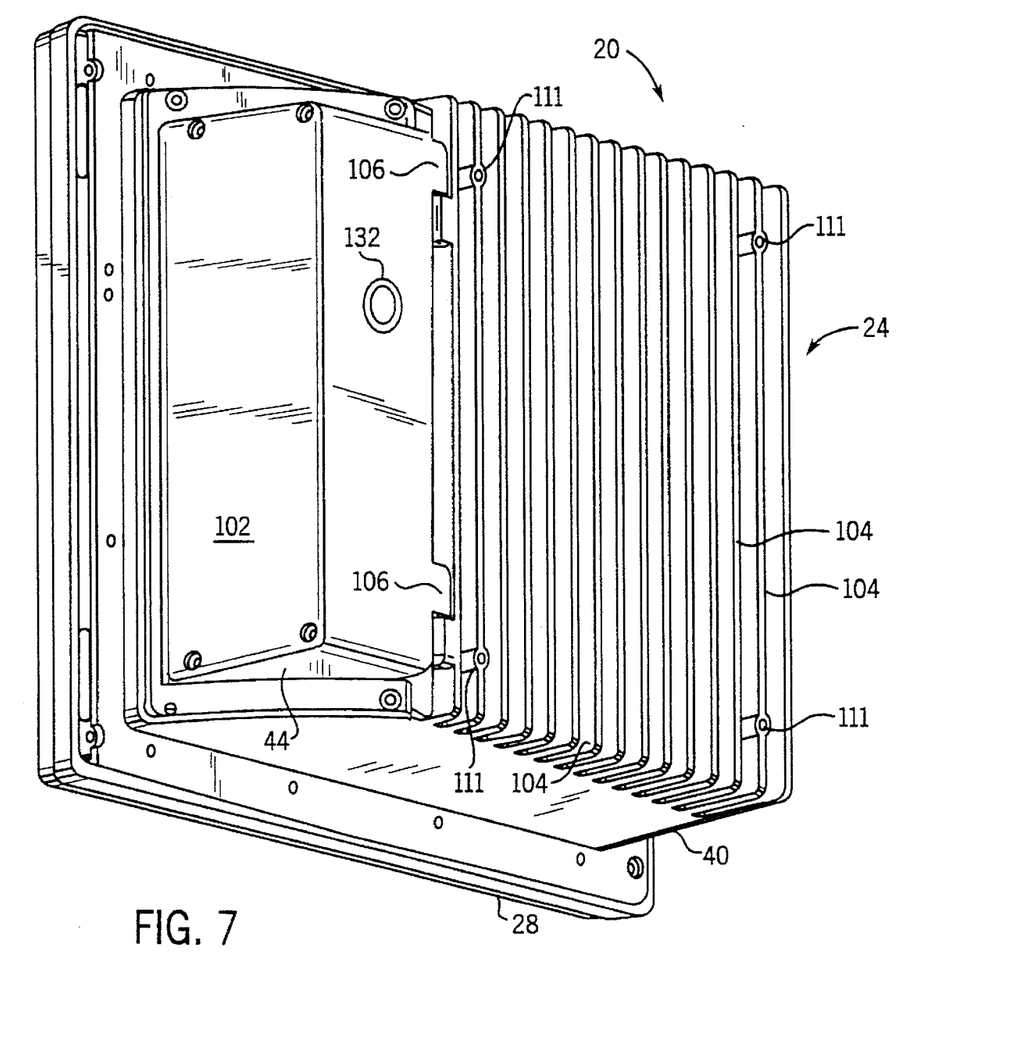
FIG. 7 is a perspective view showing the rear of the short bezel touch screen enclosure system illustrated in FIG. 1.

In FIG. 7, a rear view of enclosure system 20 shows rear enclosure section 24. Rear enclosure 40 includes hatch 44 in a closed position. Hatch 44 is coupled to enclosure 40 by hinges 106 and includes a removable panel 102. Hatch 44 is die cast aluminum. Threaded mounting holes 111 in enclosure 40 may be also used to attach it to or within a wall or panel (not shown). Enclosure 40 includes heat dissipation fins 104. Hatch 44 also can include an aperture 132 for receiving a boom mount interface.

Removable panel 102 can be removed and a compartment such as extended hatch cap 48 (FIG. 11) can be attached. Preferably, panel 102 is secured to hatch 44 via screws (not shown). Panel 102 may be removed to access cables or wires (not shown) coupled to enclosure 40, to improve air flow for system 20, or to provide ready access to floppy drives (not shown) stored in enclosure 40.

Figure 8:
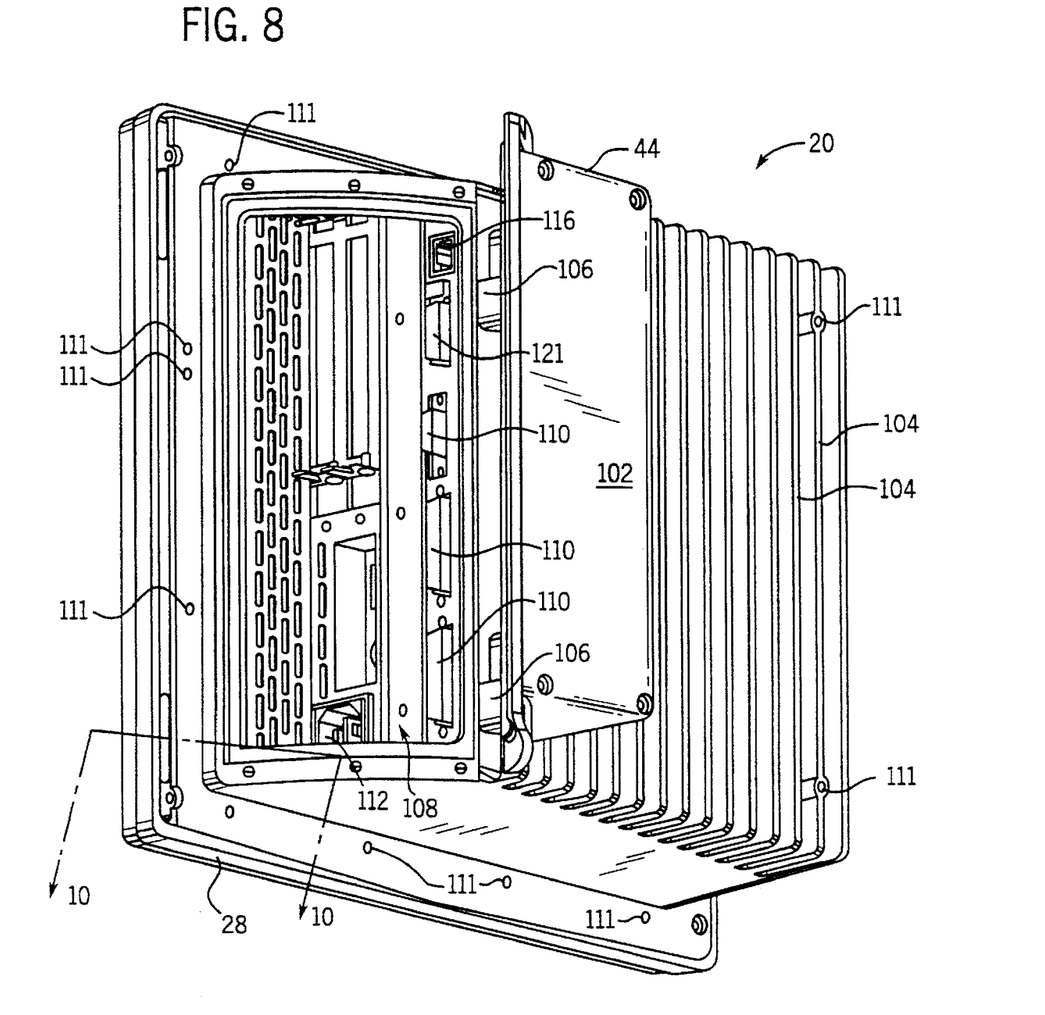
FIG. 8 is a perspective view of the short bezel touch screen illustrated in FIG. 7 showing a hatch door in an open position.

FIG. 8 illustrates enclosure system 20 with hatch 44 in an open position. Hatch 44 is pivotably coupled to rear enclosure 40 by hinges 106. Hinges 106 are preferably die cast aluminum and integrated with rear enclosure 40. A hatch door compartment 108 includes D-type electrical connectors 110 which are electrically coupled to computer equipment located in enclosure system 20. Additionally, hatch compartment 108 includes power connector 112, a connector 116, floppy disk connector 121, or other interfaces. Hatch door compartment 108 is preferably large enough to accommodate connectors 110, 112, and 116. Wires (not shown) associated with connectors 110, 112 and 116 can be inserted through aperture 132 (FIG. 7) when the boom mount is utilized.

Figure 9:
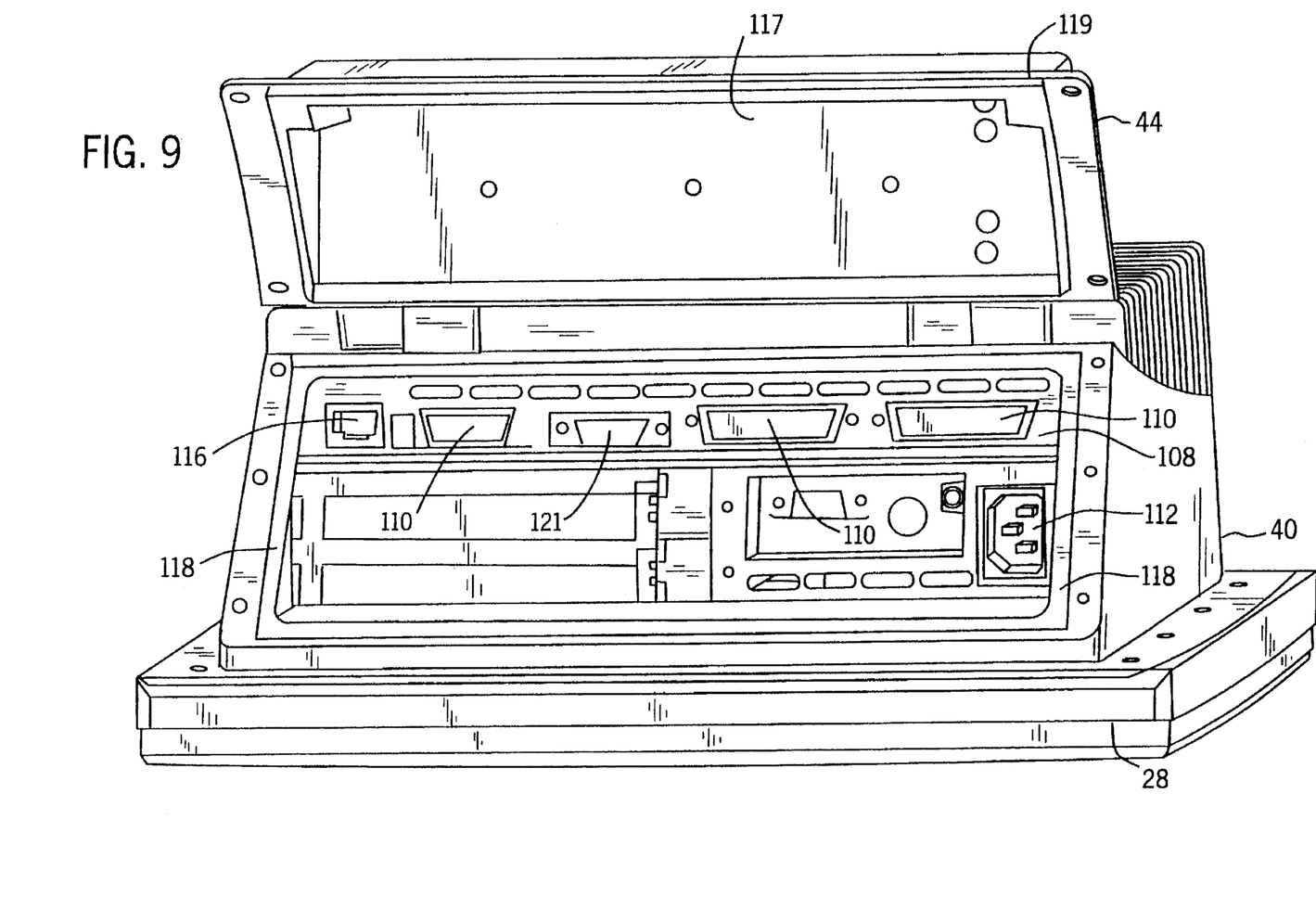
FIG. 9 is a perspective view of the short bezel touch screen enclosure system illustrated in FIG. 7 shown with the hatch door in an open position.

With reference to FIG. 9, hatch 44 includes a seal 118 for providing a watertight compartment 108. Seal 118 is squeezed by ridge 119 when hatch 44 is closed. Preferably, seal 118 is a rectangular gasket which is wider than ridge 119.

Hatch 44 has an interior surface 117 which is concave for maximizing space in compartment 108. Compartment 108 may also include LEDs (not shown) for providing indicia of the operation of the touch screen system in enclosure system 20 or access ports for use by the computer equipment (not shown) in enclosure 40.

When system 20 is used with a boom mount interface (not shown), enclosure 40 can be swung away from the boom mount (not shown). Hinges 106 and hatch door 42 allow system 20 to be pivotably moved with respect to the boom mount while system 20 is still attached to the boom mount. Such a feature allows system 20 to be more easily serviced and provides greater access to connectors 112, 114, and 116.

Figure 10:
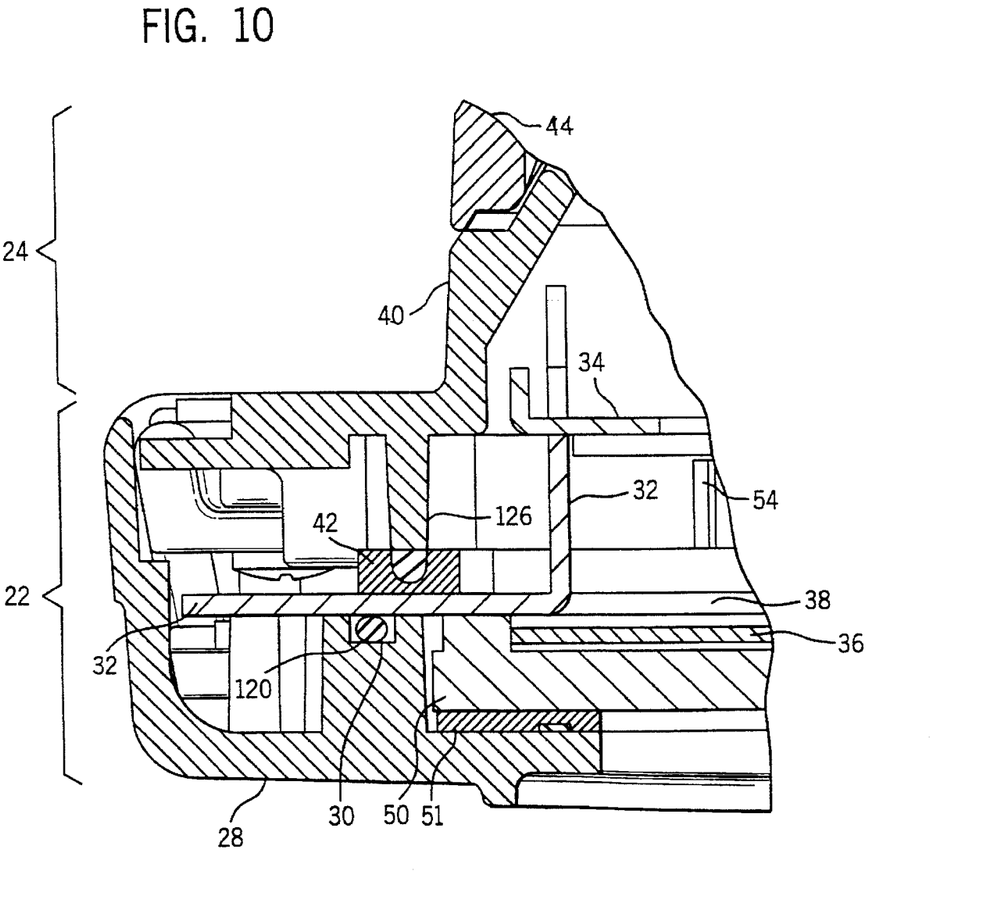
FIG. 10 is a partial cross-sectional view of a portion of the touch screen enclosure system illustrated in FIG. 8 across line 10—10.

With reference to FIG. 10, the structure of system 20 is shown in a cross-sectional view. System 20 includes an advantageous sealing mechanism comprised of seal 30 and seal 42. Seal 30 rests in a groove 120 in front bezel 28 and contacts plate 32 and front bezel 28. Seal 42 sits on a ridge 43 of rear enclosure 40 and contacts plate 32 and rear enclosure 40. Latch 88 (not shown in FIG. 11) compresses front enclosure section 22 to rear enclosure section 24 so seal 42 is squeezed between plate 32 and rear enclosure 40. The squeezing or compressing of seals 30 and 42 provides a NEMA rated watertight seal which prevents dust, liquids and small particles from reaching the interior of enclosure 40 or the interior of bezel 28. Latch 88 is configured to engage member 23 and draw bezel 28 to enclosure 40. Additionally, touch screen gasket 51 prevents dust, liquids and small particles from entering system 20 from between screen 50 and bezel 28.

Figure 11:
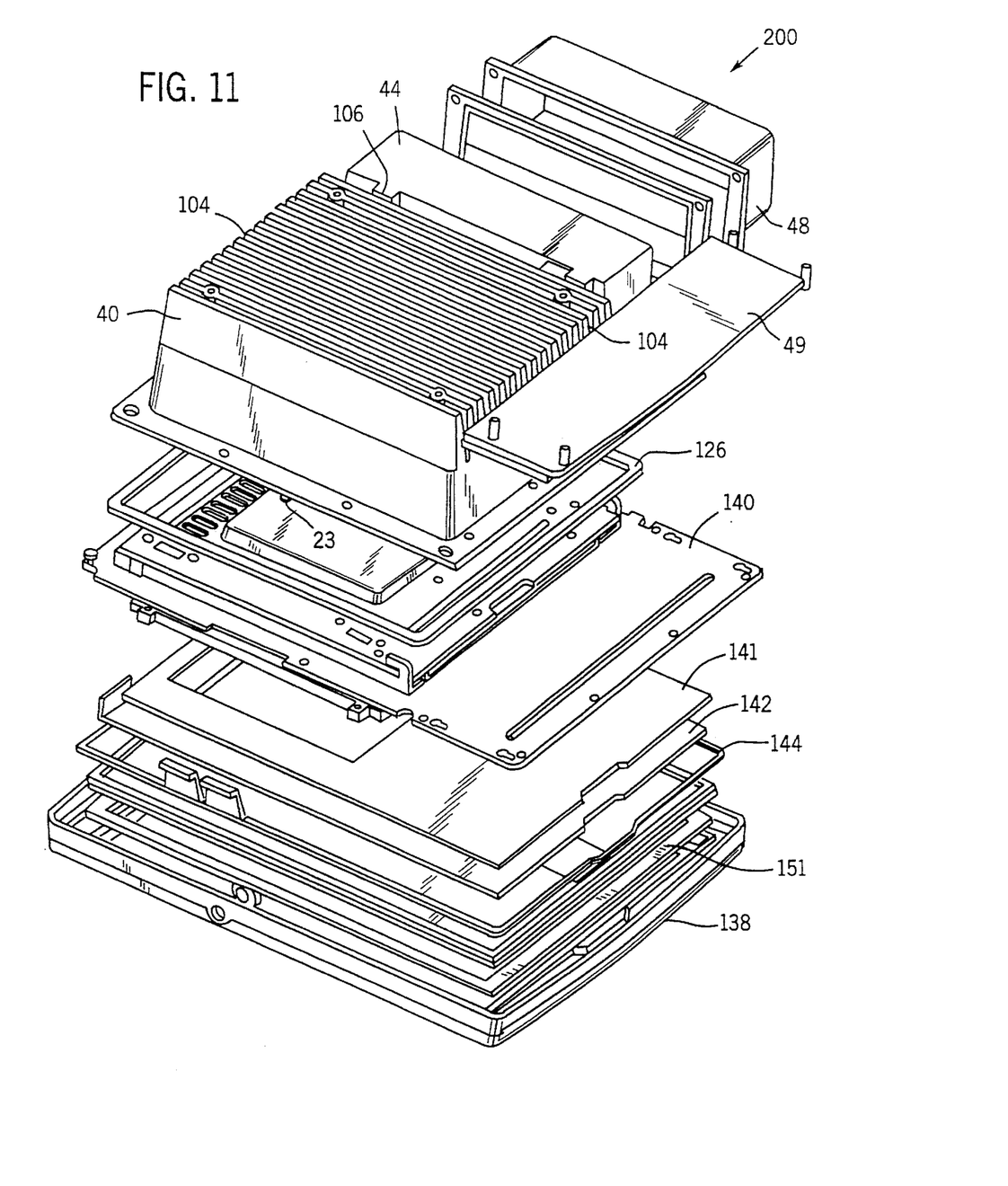
FIG. 11 is an exploded perspective view from the front of a long bezel touch screen enclosure system in accordance with a second exemplary embodiment of the present invention.

With reference to FIG. 11, enclosure system 200 includes a long bezel 138 and rear enclosure 40 substantially identical to rear enclosure 40. Long bezel 138 engages rear enclosure 40 similar to the way short bezel 28 engages enclosure 40 in system 20 described with reference to FIGS. 1–10.

Long bezel 138 is utilized to accommodate different touch screen sizes. Touch screen plate 140, plastic retainer 141, insertable custom graphic 142, gasket 151 and seal 144 are sized in accordance with the size of long bezel 138. Despite the size difference in sizes between long bezel 138 and short bezel 28, enclosure 40 may be utilized with either long bezel 138 or short bezel 28, because enclosure 40 is only sealed to touch screen plate 32 or 140 depending on which bezel 28 or 138 is utilized. In system 20, seal 42 between plate 32 and enclosure 40 prevents moisture or other debris from entering between plate 32 and enclosure 40 (FIGS. 1–10). Similarly, in system 200, seal 126 between enclosure 40 and plate 140 prevents moisture or other debris from entering between plate 140 and enclosure 40. Seal 144 prevents moisture or other debris from entering between plate 140 and long bezel 138.

Long bezel 138 can be utilized with the same rear enclosure 40 because seals 30 and 42 contact a plate 140 (instead of plate 32 in FIGS. 1–10) sized in accordance with long bezel 138. Therefore, by utilizing a two seal technique between long bezel 138 or short bezel 28 and enclosure 40, the same enclosure 40 can be a universal enclosure which is usable with long bezel 138 or short bezel 28. Therefore, manufacturing costs and equipment costs may be saved because a single universal rear enclosure 40 can be utilized for different bezels 28 or 138 in enclosure system 20 or 200.

A filler panel 49 attaches to plate 140 via fasteners or screws (not shown). Panel 49 protects a back side 143 of plate 140 which is not covered by enclosure 40.

It is understood that, while the detailed drawings and specific examples given describe preferred exemplary embodiments of the present invention, they are for the purposes of illustration only. The apparatus and method of the invention is not limited to the precise details and conditions disclosed. For example, although O-ring seals and gaskets are shown, other sealing systems are possible. Further, although hook elements are used to provide a pivotal coupling between the pan and the front bezel, other mechanisms may be utilized. Various changes can be made to the details disclosed without departing from the spirit of the invention which is defined by the following claims.

We claim:

1. An enclosure system comprising:

a touch screen being one of a plurality of screen sizes;

a front enclosure cover being one of a plurality of cover sizes associated with the one of the screen sizes, the front enclosure cover housing the touch screen;

a touch screen plate being a plate size associated with the touch screen size;

a first seal disposed between the front enclosure cover and a first side of the touch screen plate;

a rear enclosure being a single enclosure size for use with the plurality of cover sizes, the rear enclosure housing electronic components associated with the touch screen; and a second seal disposed between a second side of the touch screen plate and the rear enclosure.

2. The enclosure system of claim 1 wherein the rear enclosure is die cast aluminum.

3. The enclosure system of claim 2 wherein the rear enclosure includes heat dissipation fins.

4. The enclosure system of claim 1 wherein the electronic components are power electronic components.

5. The enclosure system of claim 1 wherein the first and second seals are compressed between the front enclosure cover and rear enclosure.

6. The enclosure system of claim 5 wherein the first seal is an O-ring seal.

7. An enclosure for a touch screen system, the enclosure comprising:

a touch screen being one of a plurality of touch screen sizes;

a touch screen plate;

electronic circuitry;

a front housing section configured to cover the touch screen, the front housing section being a front housing size associated with the one of the touch screen sizes, the touch screen being disposed between the front housing section and the touch screen plate;

a rear housing section configured to hold the electronic circuitry; and a sealing system disposed between the front housing section and the rear housing section, the sealing system providing a seal between the front housing section and the touch screen plate and between the touch screen plate and the rear housing section.

8. The enclosure of claim 7 wherein the rear housing section is die cast aluminum.

9. The enclosure of claim 8 wherein the rear housing section includes heat dissipation fins.

10. The enclosure of claim 7 wherein the electronic components are power electronic components.

11. The enclosure of claim 7 wherein the sealing system includes O-ring seals.

12. The enclosure of claim 11 wherein the sealing system is compressed between the rear housing section and the front housing section.

13. The enclosure of claim 7 wherein the front housing section is coupled to the rear housing section via a hinge.

14. An enclosure system, comprising:

a front enclosure cover;

a touch screen system, the touch screen system including a touch screen and an electronic circuit, the touch screen being contained in the front enclosure cover, the front enclosure cover being one of a plurality of different sizes; and a rear enclosure unit including:

a touch screen plate being a plate size associated with the one of the different sizes, the touch screen plate being sealably coupled to the front enclosure cover; and a universal rear housing section having an opening, the touch screen plate being sealably coupled to the rear housing section at the opening.

15. The enclosure unit of claim 14 wherein the rear housing section is die cast aluminum.

16. The enclosure unit of claim 15 wherein the rear housing section includes heat dissipation fins.

17. The enclosure unit of claim 14 wherein the electronic circuit includes power electronic components.

18. The enclosure unit of claim 14 wherein the front cover is sealed to the rear housing section via a sealing system including an O-ring seal.

19. The enclosure unit of claim 18 wherein the sealing system is compressed between the rear housing section and the front enclosure cover.

20. The enclosure unit of claim 19 wherein the front enclosure cover is coupled to the rear housing section via a hinge.

* * * * *